April 4, 1967
R. J. KUTZLER
3,312,109
FORCE RATIO RESPONSIVE DEVICE
Filed May 25, 1954
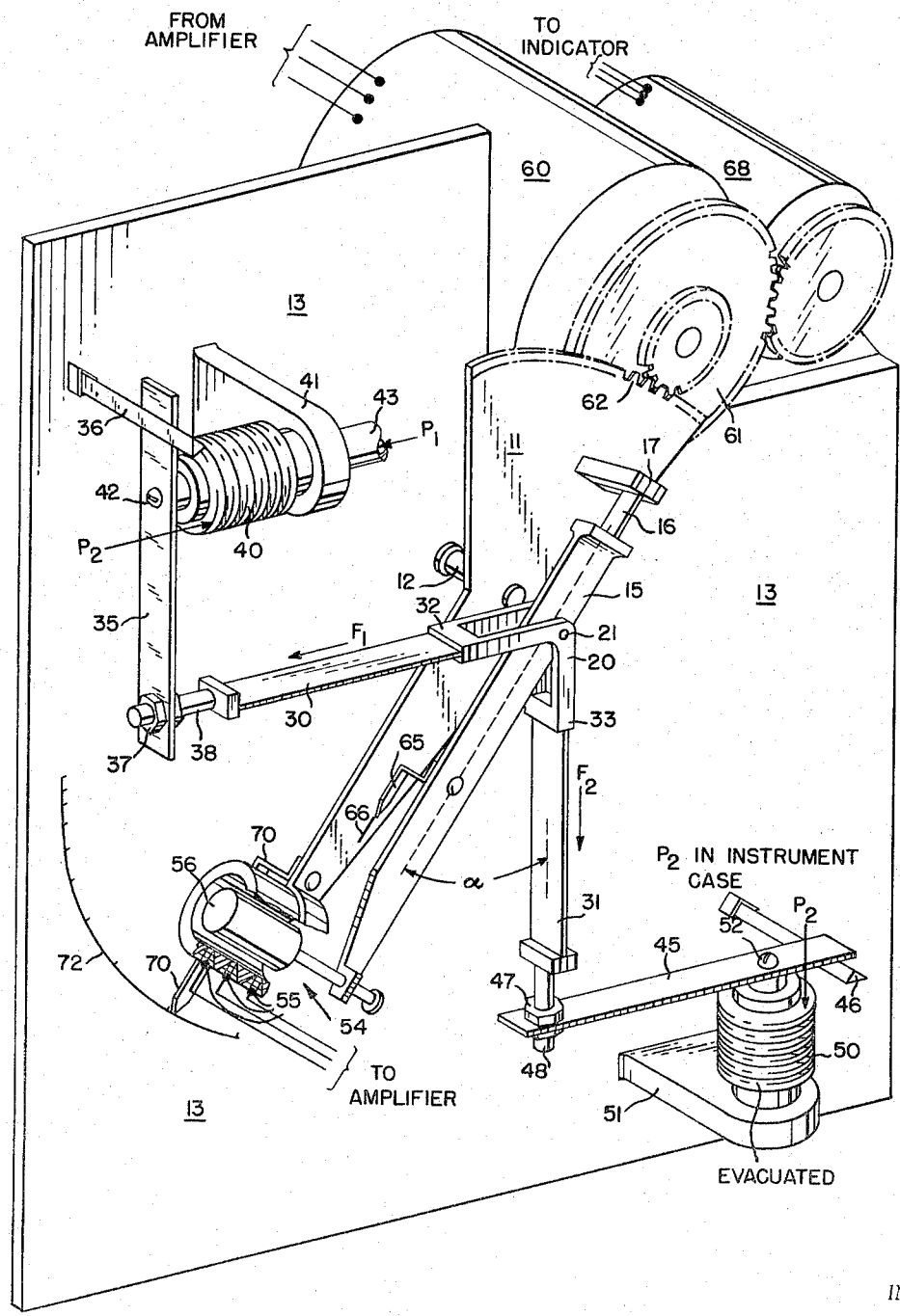
INVENTOR
ROBERT J. KUTZLER
BY *George H. Fisher*
ATTORNEY

United States Patent Office 3,312,109
Patented Apr. 4, 1967

3,312,109
FORCE RATIO RESPONSIVE DEVICE
Robert J. Kutzler, St. Louis Park, Minn., assignor to Honeywell Inc., a corporation of Delaware
Filed May 25, 1954, Ser. No. 432,249
13 Claims. (Cl. 73—407)

This invention relates to mechanical mechanisms and more particularly to a mechanical mechanism for a pressure ratio system and to the use of force moment comparison for indication and control purposes.

An object of my invention is to provide a mechanical force ratio responsive device.

Another object of my invention is to provide a force ratio responsive device that will give remote indication of force ratio.

Yet another object of my invention is to provide a force ratio responsive device that can be utilized for control purposes.

Other objects of my invention will in part be obvious and in part be described when the following specification is read in conjunction with the drawing which is a mechanical schematic of my invention.

A member in the form of a gear sector 11 is pivoted at a pivot 12 on a frame 13. A detector beam or lever 15 is pivoted at one end by a reed hinge 16 to a block 17 attached to the gear sector 11. The reed hinge 16 effectively establishes a pivotal axis for the detector beam parallel to the pivotal axis of the gear sector in the frame 13. A member 20 is pivoted to the detector beam 15 by a pin 21 which is normally on the pivotal axis of the gear sector. Two laterally flexible strips 30 and 31 extend mutually at right angles from the member 20 and are adapted to transmit the two forces being compared to the detector beam.

A lever 35 is pivoted to the frame 13 on a knife edge 36 and is attached at its other end to the strip 30 by a nut 37 on a screw 38. A bellows 40 is fixed at one end to a bracket 41 on the frame 13. The movable end of the bellows 40 is attached at 42 to the lever 35. The bellows 40 has a pressure inlet 43. A lever 45 is pivoted to the frame 13 on a knife edge 46 and is attached at its other end to the strip 31 by a nut 47 on a screw 48. An evacuated bellows 50 is attached at one end to a bracket 51 on the frame 13 and has its movable end attached at 52 to the lever 45.

If lever 35 and 45 are of equal length and the attachment 42 of bellows 40 to lever 35 is the same distance from pivot 36 as the attachment 52 of bellows 50 to lever 45 is from pivot 46 and the effective area of bellows 40 and 50 are equal, then the ratio of the two forces on member 20 is equal to the ratio of the pressures effective on bellows 40 and 50.

The resultant force caused by the pressures at bellows 40 and 50 will cause the detector beam 15 to assume a position in which the two pivots of the detector beam 15 lie along the line of the resultant force at the pivot pin 21 of the two forces due to the pressures at bellows 40 and 50.

A signal generating means 54 is composed of a coil section 55 attached to the gear sector 11 and a core portion 56 attached to the detector beam 15. The signal generating means senses the position of the detector beam 15 relative to the gear sector 11. When the pin 21 is in the same axis as pivot 12 the mechanism is in a balanced condition with a null signal from the signal generator.

A motor means 60 and gear train 61 bear a fixed relation to the frame 13, the motor 60 being mounted on frame 13. The gear train 61 engages the gear teeth 62 of gear sector 11 and is adapted to position gear sector 11 with respect to frame 13. A signal produced by the signal generating means 54 is suitably amplified by an amplifier (not shown) and applied to the motor 60 to rotate the gear sector 11 until a null signal is attained. The ratio of the pressure in bellows 40 to the pressure on bellows 50 will be indicated by the angular position of gear sector 11 on frame 13 when pin 21 and pivot 12 are in the same axis. The ratio can be measured in terms of the tangent of the angular position of the gear sector.

The embodiment of my invention shown in the drawing may be used as the sensor for a pressure ratio indicating gage for a jet engine and its operation will be described in conjunction with such application. The exhaust tailpipe pressure $P_1$ is sensed by bellows 40 through pressure inlet 43. The engine inlet pressure $P_2$ is within a case (not shown) of the device and surrounds the outside of both bellows 40 and 50. The force $F_1$ on the detector beam 15 is proportional to $P_1-P_2$. The force $F_2$ on the detector beam 15 is proportional to $P_2$. The tangent angle $\alpha$ between the detector beam 15 and extension 31 will equal $F_1/F_2$. Therefore, tan angle $\alpha$ is equal to $$\left(\frac{P_1-P_2}{P_2}\right)K \text{ or } \left(\frac{P_1}{P_2}-1\right)K$$

where K is a constant determined by the area of the bellows, the length of 35 and 45 and position on 35 and 45 of 42 and 52. This forms the usable pressure ratio relationship to provide indication or control.

If we now start from a balanced condition with pin 21 and pivot 12 in the same axis with the resultant of the forces $F_1$ and $F_2$ falling in line with the detector beam 15 the following will show the function of the device. With an increase in $P_1$ to change the ratio of $P_1$ to $P_2$ the force $F_1$ will be proportionally increased. The increasing of force $F_1$ will cause the detector beam 15 to rotate clockwise with respect to gear sector 11 at reed hinge 16. The signal generator 54 will detect this relative movement and through an amplifier (not shown) causes rotation of motor 60. Motor 60 when rotating will cause gear train 61 which engages gear sector 11 to rotate clockwise also. This will cause clockwise rotation of gear sector 11 about pivot point 12. The rotation of gear sector 11 will cause a rotation of the pivot 16 of the detector beam 15 on gear sector 11. The movement of the pivot 16 of detector beam 15 will cause a change of the relative position of point 21 on detector beam 15 with respect to gear section 11 in order to balance the force moments on detector beam 15 from $F_1$ and $F_2$. This process will continue until pin 21 and pivot 12 again are in the same axis and the signal generator is again in a null position. There will now be a different angle $\alpha$ between the detector beam 15 and extension 31. The pressure ratio of the changed $P_1$ and $P_2$ will again be a function of the tangent of the angle $\alpha$.

A pointer 65 is attached to detector beam 15 and cooperates with dial markings 66 and gear sector 11 to give a visual indication of when pin 21 and pivot 12 are in the same axis and the mechanism is in a balanced condition.

An extension 70 attached to gear sector 11 has a pointer that cooperates with a dial on the frame 13. Dial 13 can be calibrated to indicate the pressure ratio of the pressures $P_1$ to $P_2$.

If remote indication is desirable a synchro 68 can be added to engage the gear train 61 and position a remote dial indicator (not shown). The amount of rotation of gear sector 11 will affect the amount of rotation of the synchro 68 and hence the positioning of the dial indicator.

My invention can also be used as the sensing unit for a control means, in which case a potentiometer or other type of signal generator can be substituted for the synchro motor to provide the electrical signal. My invention can also be used for control purposes where the motor, gear train, and synchro motor are eliminated and the gear sector fixed in relation to the frame by some adjusting means at a desired pressure ratio with the signal generator then used to actuate a control means to provide control of the pressures.

The resultant electrical signal of a potentiometer substituted for the synchro motor can be fed through an amplifier and used to control the angle of attack or engine throttle position in a Mach controller or the optimum power setting for thrust during cruise control and accurate indication of thrust for take-off.

I do not intend to limit my invention to the specific components shown in the drawing as one skilled in the art can see that many substitutions or changes can be made without departing from the spirit of my invention. For example, various types of signal generators could be used in place of the differential transformer 54 shown in the drawing. A capacitor type pick-off or plain electrical contacts operating a relay and hence a reversible motor could be used. Also my invention is not limited to the particular structure shown for applying the forces $F_1$ and $F_2$ to member 20. Nor do I intend to limit my invention to bellows as the condition sensing elements, as any other type such as bimetal, or any condition that may be resolved into forces where the ratio of one to another is desirable can be used. Many other substitutions could be made that would not alter the spirit of my invention.

Some of the salient features of my invention are: the ratio determination is inherent in the mechanical sensor, the forces due to pressure are directly related to the signal generator so that no electrical network is needed to establish ratio. The force-balance system is unique in that a minimum of frictional loads affect the wanted output. The indication is provided by the powered section and any load exerted to produce the indication or control does not produce hysteresis or reversal loss. The signal generator merely monitors and directs the positioning of the motor to provide the proper indication or control signal.

What is claimed and desired to be secured by United States Letters Patent is:

1. In a force ratio responsive device, a frame, a member pivotally mounted on said frame on a first axis, a detector beam pivotally mounted on said member on an axis parallel to but displaced from said first axis, two condition responsive means having one end of each mounted on said frame, the other end of each condition responsive means being movable, means respectively connected to said movable ends for applying two mutually perpendicular forces at a point on said detector beam that is normally on said first axis with the resultant of the two forces normal to said first axis and through the pivot mounting of said detector beam on said member when said first axis and point of application of said two mutually perpendicular forces coincide, cooperating means on said member and said detector beam indicating coincidence of the point of application of the two forces on said detector beam with said first axis, means sensitive to said coopearting means for angularly positioning said member about said first axis to dispose the pivotal axis of said detector beam so that the line of the resultant of the two forces passes through said first axis, and means indicating the angular position of said member on said frame and hence the ratio of the two forces.

2. In a force ratio responsive device, a frame, a member pivotally mounted on said frame on a first axis, a lever pivotally mounted on said member on an axis parallel to but displaced from said first axis, two condition responsive means having one end of each mounted on said frame, the other end of each condition responsive means being movable, means respectively connected to said movable ends for applying two mutually perpendicular forces at a point on said lever that is normally on said first axis with the resultant of the two forces normal to said first axis, cooperating means on said member and said lever indicating coincidence of said first axis and the point of application of the two forces on said lever, and means sensitive to said cooperating means for angularly positioning said member about said first axis to dispose the pivotal axis of said lever so that the line of the resultant of said two forces passes through said first axis.

3. In a force ratio responsive device, a base, a member pivotally mounted on said base on a first axis, a lever pivotally mounted on said member on an axis parallel to but displaced from said first axis, two condition responsive means having one end of each mounted on said base, the other end of each condition responsive means being movable, means respectively connected to said movable ends for applying two mutually perpendicular forces at a point on said lever that is normally on said first axis with the resultant of the two forces normal to said first axis, cooperating means on said member and said lever indicating coincidence of first axis and the point of application of the two forces on said detector beam, and means sensitive to said cooperating means for angularly positioning said member about said first axis to dispose the pivotal axis of said lever so that the line of the resultant of the two forces passes through said first axis, means for indicating the angular position of said lever with respect to said base and hence the ratio of the two conditions sensed.

4. In a force ratio responsive device, a base, a member pivotally mounted on a first axis on said base, a lever pivotally mounted on said member on an axis parallel to but displaced from said first axis, means for applying two mutually perpendicular forces at a point on said lever that is normally on said first axis and with the resultant of the two forces normal to said first axis, means sensitive to the relative position of said member to said lever for angularly positioning said member about said first axis to dispose the pivotal axis of said lever so that the line of the resultant of the two forces passes through said first axis, and means indicating the angular position of said member on said base and hence the ratio of the two forces when the point of application of the two forces on said lever coincides with said first axis.

5. In a force responsive device, a base, a member pivotally mounted on a first axis on said base, a lever pivotally mounted on said member on an axis parallel to but displaced from said first axis, means for applying two forces at a point on said lever that is normally on said first axis, and means sensitive to the relative position of said member to said lever for angularly positioning said member about said first axis to dispose the pivotal axis of said lever so that the line of the resultant of the two forces passes through said first axis.

6. In a force responsive device, a base, a member pivotally mounted on a first axis on said base, a lever pivotally mounted on said member on an axis parallel to but displaced from said first axis, means for applying two forces at a point on said lever that is normally on said first axis, means sensitive to the relative position of said member to said lever, and motor means responsive to said means for angularly positioning said member about said first axis to dispose the pivotal axis of said lever so that the line of the resultant of the two forces passes through said first axis.

7. In a force ratio responsive device, a base, a gear sector pivotally mounted on said frame on a first axis, a detector beam pivotally mounted by a reed hinge on said gear sector on an axis parallel to but displaced from said first axis, a member pivoted on said detector beam, two lever means each pivoted on said frame so as to apply a tensile force to one of each of two arms of said member, two bellows each fixed at one end to said frame and applying a force at the other end to one of each of said two lever means, said force transmitted to said member being proportionate to pressure applied to each of said bellows, the pressures in each of said bellows tending to cause a movement of said detector beam relative to said gear sector, the pivot point of said member being normally on said first axis and with the resultant of the two forces applied to the arms of said member being normal to said first axis, cooperating means on said gear sector and said detector beam indicating coincidence of the pivot point of said member with said first axis, a motor and gear train mounted in fixed relation to said base such that said gear train engages said gear sector, said motor and gear train being actuated by said cooperating means in an unbalanced condition to rotate said gear sector back to a balanced condition, and a synchro actuated by said gear train to position an indicating means to indicate the angular position of said gear sector and hence the ratio of said two pressures.

8. In a force ratio responsive device, a base, a gear sector pivotally mounted on said base on a first axis, a detector beam pivotally mounted by a reed hinge between said first axis and the gear teeth of said gear sector on said gear sector on an axis parallel to said first axis, a member pivoted on said detector beam, two lever means each pivoted on said frame so as to apply a tensile force to one of each of two arms of said member, two bellows each fixed at one end to said frame and cooperating at the movable end one with each of said two lever means, said bellows applying a force through said lever means and member to said detector beam proportionate to the pressures in said bellows, the pivot point of said member normally being on said first axis and with the resultant of the two forces being applied to the arms of said member normal to said first axis and passing through the pivot of said detector beam and gear sector, a signal generator on said gear sector and said detector beam indicating coincidence of the pivot of said member with said first axis, a motor and gear train mounted in fixed relation to said base such that said gear train engages said gear sector, said motor and gear train being actuated by said signal generator upon a displacement of said pivot of said member from said first axis to rotate said gear sector about said first axis until said pivot of said member again coincides with said first axis, and a synchro actuated by said gear train to position a remote indicating means to indicate the angular position of the gear sector and hence the ratio of said two pressures.

9. A force ratio responsive device comprising a frame, a member pivoted on said frame on a first axis, a lever pivotally engaging said member on an axis parallel to but displaced from said first axis, means applying two mutually perpendicular forces to said lever, said device being in a balanced condition when the resultant of said forces passes through the pivot point of said member on said frame and the point of pivotal engagement of said lever and said member, means responsive to the angular positions of said member and said lever, motor means controlled by said last named means for angularly positioning said member to bring said device to said balanced condition, and means indicating the angular position of said member with respect to said applied forces and hence the ratio of said forces.

10. In a force ratio responsive device, a member rotatable about a first axis, a lever rotatable about a second axis parallel to said first axis, means for moving said second axis in response to movement of said member, two mutually perpendicular forces acting on said lever at a point normally coaxial with said first axis, and means sensitive to relative movement between said lever and said member to move said member when said forces move said lever so that the point of application of said forces is re-established colinear with said first axis, the angular position of said lever and said member when said colinearity exists between a function of the ratio between said forces.

11. In a force ratio responsive device, a rotatable member pivoted about a first axis, a second member pivotally mounted on said rotatable member about an axis parallel to but displaced from said first axis, means for applying a plurality of forces normally mutually perpendicular to each other to a point on said second member which normally is coincident with said first axis, means responsive to displacement of said point on said second member from said coincidence due to variations in said forces, and means controlled by said responsive means for rotating said rotatable member about said first axis to re-establish coincidence of the point on said second member with said first axis.

12. In a force ratio responsive device, a rotatable member pivoted about a first axis, a second member pivotally mounted on said rotatable member about a second axis parallel to but displaced from said first axis, means for applying a plurality of forces normally in fixed angular relationship with respect to each other to a point on said second member proximate said first axis and normally lying in the plane of said axes, said forces exerting opposed turning moments on said second member about said second axis, means responsive to displacement of said point from said plane due to variations in said forces, and means controlled by said responsive means for rotating said rotatable member about said first axis to re-establish said point in said plane.

13. A ratio indicator comprising a pair of force producing devices, links lying at an acute angle to each other and respectively connected to the force producing devices to have a force exerted thereon longitudinally of the links by the force producing devices, a reaction link pivoted at one end on a supporting pivot and at its other end pivotally interconnected to the first named links, means mounting the supporting pivot for movement in an arc about the pivotal interconnection, means responsive to movement of the links to produce a regulated force, and means responsive to the value of the regulated force to shift the supporting pivot in a direction to rebalance the forces acting on the first named links, the position of the supporting pivot indicating the ratio of said forces.

References Cited by the Examiner
UNITED STATES PATENTS

| | | | |
|---|---|---|---|
| 2,352,312 | 6/1944 | Donaldson | 73—388 |
| 2,427,235 | 9/1947 | Smoot | 137—86 |

LOUIS R. PRINCE, *Primary Examiner.*

CHARLES A. CUTTING, ROBERT EVANS,
*Examiners.*

D. C. WOODIEL, *Assistant Examiner.*